E. J. EDWARDS.
LIGHTING SYSTEM CONTROL.
APPLICATION FILED DEC. 10, 1915.
1,306,411.
Patented June 10, 1919.
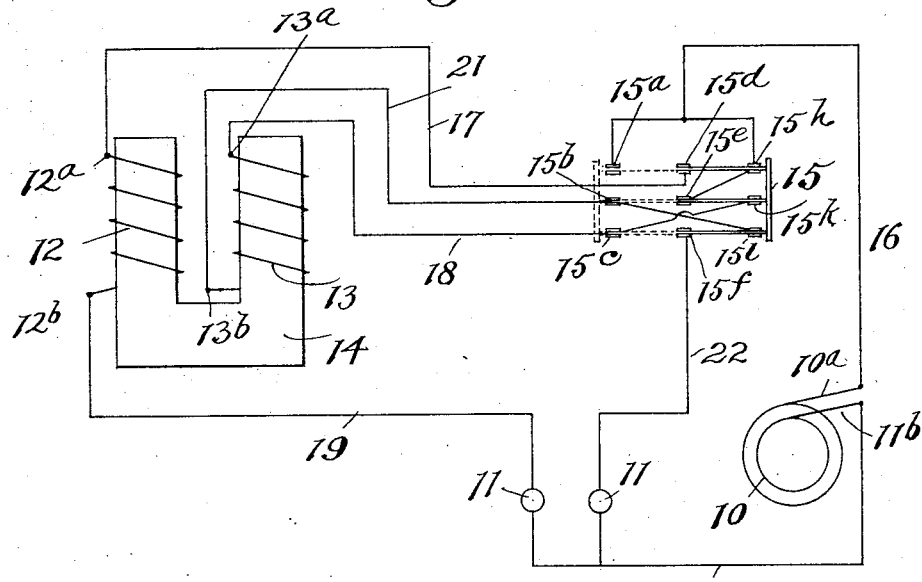
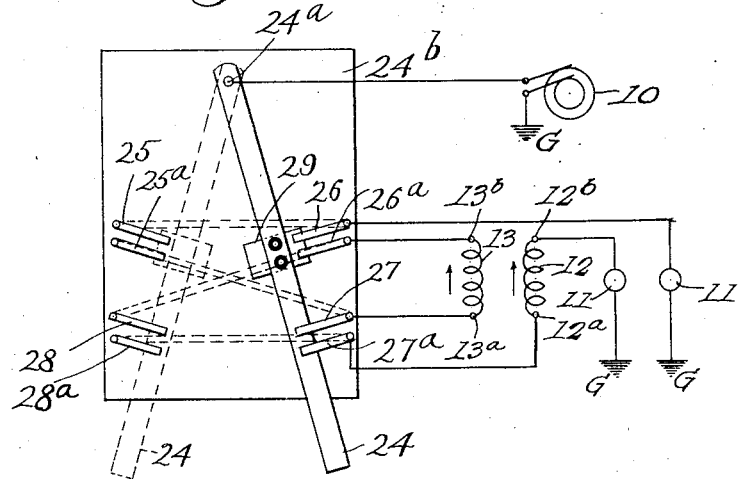
Inventor:
Evan J. Edwards
by Thurston & Kwis
Attorneys

UNITED STATES PATENT OFFICE.

EVAN J. EDWARDS, OF EAST CLEVELAND, OHIO.

LIGHTING-SYSTEM CONTROL.

1,306,411.  Specification of Letters Patent.  Patented June 10, 1919.

Application filed December 10, 1915. Serial No. 66,069.

*To all whom it may concern:*

Be it known that I, EVAN J. EDWARDS, a citizen of the United States, residing at East Cleveland, in the county of Cuyahoga and State of Ohio, have invented a certain new and useful Improvement in Lighting-System Controls, of which the following is a full, clear, and exact description.

This invention relates to certain new and useful improvements in the control of lamps of a lighting circuit, and particularly one operated by or supplied with alternating current.

More specifically considered, the invention in one aspect relates to the protecting of one or more of the lamps from excessive voltage in the event that one or more other lamps fail or are extinguished, this feature having particular utility in a system supplied by an alternating current generator having what is known as a drooping characteristic, i. e., a generator which has a lower terminal voltage the greater the load put upon it. In another aspect the invention relates to means for dimming the lamps in an alternating current lighting the system whether or not supplied by a generator having a drooping characteristic.

Additionally, my invention relates to the features above explained utilized in conjunction with means for regulating the voltage in a system supplied with alternating current whose frequency is varied by variations in speed of the generator.

The main object of the invention is to accomplish the results above mentioned in a simple manner and with small, compact and efficient apparatus.

It is a well known fact that the voltage in an alternating current system supplied with current whose frequency is not constant, can be regulated by reactance which produces an induced electromotive force which counter-balances or substantially counter-balances change of voltage due to a change in speed of the generator. In my improved controlling device I take advantage of this well known means for regulating purposes, and by certain improvements, including a proper proportioning and arrangement of elements as well as the provision of a switch by which certain connections can be reversed, I obtain in addition a protection for one or more of the lamps in the event of failure of other associated lamp or lamps, as well as the dimming action above referred to.

By way of preliminary explanation it may be stated that in a lighting circuit such as I have illustrated in this case and adapted particularly for automobiles, I employ a two-coil reactance, the two coils surrounding portions of a common core and connected in series with the lamps. Normally these coils are in opposition to each other in the sense that they produce opposing fluxes. This part of the apparatus is so designed that not only is the voltage regulated very closely, but when employed in a system supplied by a generator having a drooping characteristic if one of the lamps is extinguished so that the opposing action of the two coils is eliminated by one of the coils becoming ineffective, the induced electromotive force in the other coil in series with the remaining lamp or lamps is increased to such an extent that it is not only protected against being burned out but the voltage across the terminals of the lamp remains substantially the same as prior to the extinguishment of the other lamp or lamps. Additionally, I provide in conjunction with this reactance a switch by which the connections of one of the coils can be reversed so that the coils of the reactance assist each other and each induces a higher electromotive force than when the coils oppose each other, with the result that the voltage across the lamp terminals is reduced and the lamps are dimmed.

My invention may be further briefly summarized as consisting in certain novel details of construction and combinations and arrangements of parts which will be described in the specification and set forth in the appended claims.

In the accompanying sheet of drawings, Figure 1 shows diagrammatically a lighting system embodying my invention, and Fig. 2 shows the same with a different form of switch.

Referring now to the drawings, 10 represents an alternating current generator which may be a magneto generator such as is commonly employed for lighting and ignition purposes on automobiles. This generator is adapted to supply current to incandescent lamps 11, two of which are here shown and which are in separate branches of a multiple circuit, as will subsequently appear. The two lamps 11 are intended particularly to represent the two headlights of a motor driven vehicle, but instead of either of the single lamps I might employ two or more lamps connected in series or multiple. For example: A relatively small tail lamp of a motor driven vehicle may be connected in series or multiple with one of the head lamps. In this system I employ a reactance composed of two coils 12 and 13, each of which is in series with one of the lamps, and which surround separate portions of an iron core 14. In addition I employ a switch which, as illustrated in Fig. 1 at 15, is in the form of a double-throw three-pole switch having three sets of contacts 15$^a$, 15$^b$, 15$^c$, 15$^d$, 15$^e$, 15$^f$, 15$^h$, 15$^k$, and 15$^l$. It will be understood, however, that this type of switch is illustrated simply for the sake of clearness, for with a switch of this form the connections can perhaps be most easily explained.

It will be observed that one terminal 10$^a$ of the generator 10 is connected by conductor 16 to contacts 15$^a$ and 15$^h$ of the switch. It will be seen also that the contact 15$^h$ is cross-connected to contact 15$^e$; that contact 15$^k$ is cross-connected to contact 15$^c$; and that contact 15$^b$ is cross-connected to contact 15$^l$. Contact 15$^d$ is connected by a conductor 17 to the terminal 12$^a$ of coil 12, and in a similar manner contact 15$^e$ is connected by conductor 18 to terminal 13$^a$ of coil 13. The other terminal 12$^b$ of coil 12 is connected by a conductor 19 to one of the lamps 11 which in turn is connected to conductor 20 leading to the opposite terminal 11$^b$ of the generator. The other terminal 13$^b$ of coil 13 is connected by a conductor 21 to contact 15$^b$ which, as before stated, is cross-connected to contact 15$^l$. Contact 15$^f$ is connected by conductor 22 to one terminal of the other lamp 11. The second terminal is connected to the conductor 20. The conductor 20 which connects the two lamps with one terminal of the generator may be a ground conductor such as afforded by the metal frame of the motor vehicle.

It will be observed that when the switch is in the full line position shown in Fig. 1 current passes at any instant from the terminal 10$^a$ of the generator to contact 15$^h$ of the switch and from this point it passes through both coils of the reactance in the same direction and through the two lamps to the opposite terminal of the generator. Therefore, with the switch in this position proper connections are made to cause opposition of the two magnetic fluxes set up by the two coils of the reactance, hence the connections suitable for full light under normal conditions, i. e., with all lamps operative. It will be observed also by tracing the connections that when the switch is thrown to the dotted line position the connections are the same as before, except that current passes in the reverse direction through coil 13, with the result that the coils produce fluxes which are in the same direction, i. e., the fluxes do not oppose each other, in consequence of which there is an increased voltage drop across each coil or an increased counter electro-motive force, and a resulting diminution of voltage across the terminals of the lamps. In other words, the current passing through the lamps is decreased and the lamps are, therefore, dimmed. Thus by simply reversing the position of the switch the lamps can be changed from full or normal intensity to a fraction of the normal intensity. In other words, by employing the switch 15 for the purpose of reversing the connections of one of the coils of the reactance I am able to use the reactance not only for regulating purposes so that the voltage drop across the lamps will be substantially constant at different speeds at which the generator is driven, but also for the purpose of dimming the lamps and so am enabled to comply with the present existing laws of many States which require that the lamps be dimmed either while the motor vehicle is traversing the streets of a city or while passing motor vehicles driving in the opposite direction along country roads.

It might be mentioned at this point that the two coils have a regulating action when they produce fluxes which oppose each other as well as when they produce fluxes which assist each other. The regulating action takes place when the fluxes are opposing, for the reason that with the coils wound on separate limbs of a core as shown, there is considerable magnetic leakage, it being understood that the magnetic effects of the two coils would neutralize each other only when the flux produced by one coil all threaded through the other coil.

With the above described device not only are the advantages above enumerated obtained, but in addition it prevents one of the lamps being burned out by the accidental extinguishment of the other, for the reason that when one lamp burns out the corresponding coil of the reactance is rendered ineffective and this results in an increased induced electro-motive force in the other coil so that the voltage drop across the other lamp is not abnormally increased as it would be without the voltage controlling device especially if employed on a generator such as a magneto generator having a drooping characteristic. Preferably the reactance is designed so that the electric and magnetic constants are such that when one lamp is accidentally extinguished the voltage across the terminals of the other lamp is not increased but remains the same or substantially the same as when both lamps are in parallel.

In Fig. 2 I have shown a switch 23 as simplified and reduced to practice by me.

In this switch 24 is a conducting lever which is pivoted at 24$^a$ to an insulating base 24$^b$. The base carries four pairs of normally separated or insulated contacts 25, 25$^a$, 26, 26$^a$, 27, 27$^a$ and 28 and 28$^a$. As shown in Fig. 2 the contact 25 is cross-connected to the contact 26; contact 26$^a$ is cross-connected to contact 28; contact 25$^a$ is cross-connected to contact 27 and contact 28$^a$ is cross-connected to contact 27$^a$. These cross-connections are preferably made on the back of the insulating base 24$^a$. Additionally, the contact lever 24 carries a contact strip 29 which is insulated from the lever 24. In the use of this switch the lever will be connected to one terminal of the generator as shown in Fig. 2; contacts 25 and 26 will be connected to a terminal of one of the lamps; contact 25$^a$ and contact 27 will be connected to terminal 13$^a$ of coil 13; contact 26$^a$ and contact 28 which is cross connected thereto will be connected to terminal 13$^b$ of coil 13; and contacts 27$^a$ and 28$^a$ will be connected to terminal 12$^a$ of coil 12. When the switch blade 24 is in the full line position shown so that the contact plate 29 bridges the contacts 26 and 26$^a$ and so that the blade 24 bridges contacts 27 and 27$^a$, the electrical connections will be precisely as in Fig. 1, with the current passing through the coils in the same direction so as to produce opposing fluxes. When the switch is in the dotted line position the same connections are obtained with the exception that the current is reversed through coil 13 and the dimming action previously explained is obtained. It will be understood that when the switch blade is in its middle or off position the circuits are open and the lights are extinguished.

Having thus described my invention, what I claim is:

1. In a lighting system, a source of alternating current, a plurality of lamps arranged in separate branches of the system and connected to the source, a reactance having coils connected to the source and located in the different branches, the coils being inductively related, and a switching device for reversing the connections of one of the coils.

2. In combination in a lighting system, a source of alternating current, a plurality of lamps connected to the source, a reactance having two coils connected between the source and the lamps and surrounding a common core, said coils normally producing opposing fluxes, and switching means for reversing the connections of one of the coils so that coils will produce assisting or additive fluxes.

3. In a lighting system an alternating current generator having a drooping characteristic, lamps connected to the system and arranged in two branches thereof, a reactance between the lamps and the source and having two coils each connected in one of the branches, and switching means for reversing the direction of flux produced by one of the coils with respect to the flux produced by the other.

4. In a lighting system, an alternating current generator, lamps connected in the system and arranged in two branches thereof, a reactance between the lamps and the source and having two coils each connected in one of the branches, and a switch for disconnecting the lamps, for connecting the lamps in the circuit with the connections of the coils such that the fluxes produced thereby are additive or in the same direction, and for reversing the connections of one of the coils so that the fluxes produced thereby oppose each other.

In testimony whereof, I hereunto affix my signature in the presence of two witnesses.

EVAN J. EDWARDS.

Witnesses:
M. M. ROYAN,
C. V. SCHURGER.